No. 806,446. PATENTED DEC. 5, 1905.
R. L. YOUNG.
FENDER.
APPLICATION FILED SEPT. 6, 1905.
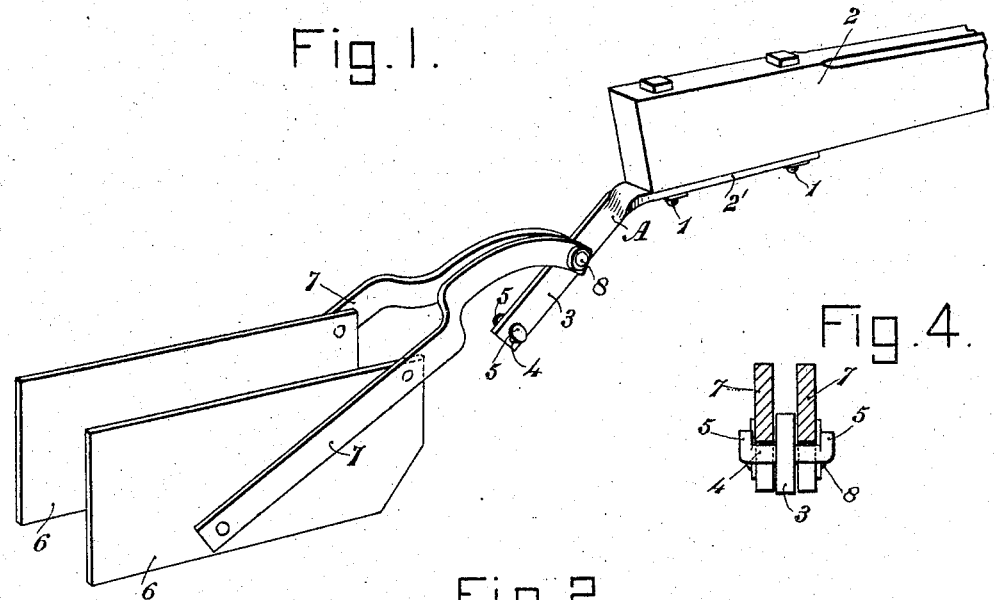
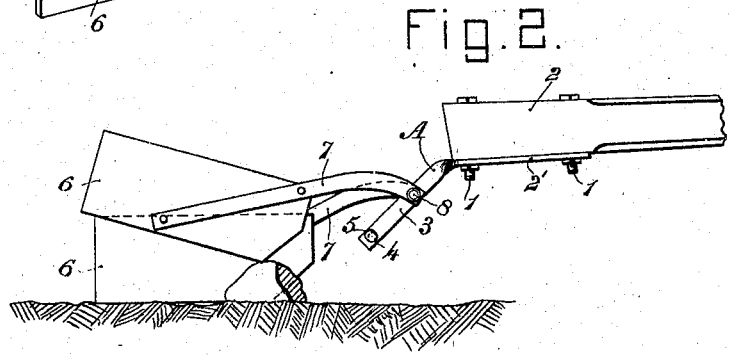
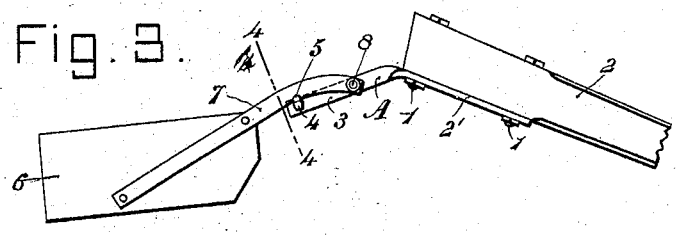
Robert L. Young, Inventor
Witnesses
by C. A. Snow & Co., Attorneys

UNITED STATES PATENT OFFICE.

ROBERT L. YOUNG, OF MORELAND, GEORGIA.

FENDER.

No. 806,446.  Specification of Letters Patent.  Patented Dec. 5, 1905.

Application filed September 6, 1905. Serial No. 277,169.

*To all whom it may concern:*

Be it known that I, ROBERT L. YOUNG, a citizen of the United States, residing at Moreland, in the county of Coweta and State of Georgia, have invented a new and useful Fender, of which the following is a specification.

This invention relates to fenders for cultivating implements; and the object of the invention is to construct a protecting device for young plants which may be easily attached to the beam of an ordinary cultivating implement and which shall be simple in construction, durable and efficient in operation, and which shall also be of an improved construction, whereby the blades composing the fender may independently rise and fall so as to pass over possible obstructions, while means are also provided whereby said fender-blades may be simultaneously elevated from ground-engaging position, together with the cultivating implements which are attached to the beam with which the fender is connected.

With these and other ends in view, which will readily appear as the nature of the invention is better understood, the same consists in the improved construction and novel arrangement and combination of parts, which will be hereinafter fully described, and particularly pointed out in the claims.

In the accompanying drawings has been illustrated a simple and preferred form of the invention, it being, however, understood that no limitation is necessarily made to the precise structural details therein exhibited, but that changes, alterations, and modifications within the scope of the invention may be made when desired.

In the drawings, Figure 1 is a perspective view showing the improved fender attached to the rear end of a cultivator-beam. Fig. 2 is a side elevation, slightly reduced, showing the fender in operative position with one of the blades raised in the act of passing over an obstruction. Fig. 3 is a side elevation showing the fender elevated to a non-operative position. Fig. 4 is a transverse sectional detail view taken on the plane indicated by the line 4 4 in Fig. 3.

Corresponding parts in the several figures are indicated throughout by similar characters of reference.

A designates a quarter-twisted strap or bar of metal, the horizontal portion of which is perforated for the passage of bolts 1, whereby it is secured upon the under side of a cultivator-beam 2 at the rear end of the latter, the cultivator-blades being not shown in the drawings. The horizontal portion of the quarter-twisted bar is designated 2' to distinguish it from the vertical portion 3, which is bent downwardly at an angle to the portion 2' and which is provided near its free end with a transverse member, such as a pin 4, having upturned ends forming hooks 5 5.

The fender-blades 6 6, which may be made of sheet-iron plates of suitable dimensions, are provided upon their outer sides with exteriorly-disposed oblique straps 7 7, the forward ends of which are bent or converged in the direction of each other, the extreme front ends of said straps being pivotally connected with the downturned portion 3 of the bar A, as by a pin or pivot 8. It is to be understood that the slats carrying the fenders may turn independently upon the pivot 8 and that the forward ends of said straps are capable of engaging the hooks 5 and of being supported by said hooks when the rear end of the cultivator-beam is tilted in an upward direction, as is customary when it is desired to disengage the cultivator-blades from the ground.

The operation and advantages of this improved device will be readily understood from the foregoing description, taken in connection with the drawings hereto annexed, by those skilled in the art to which it appertains. The construction is extremely simple and inexpensive, and the improved fender may be readily attached to the beam of any ordinary cultivator in which provision is made for the tilting of the beams. The fender-blades will protect the young plants against injury, and said blades are free to move independently in an upward direction, as shown in Fig. 2 of the drawings, so as to pass over obstructions, such as stones and the like. In order to more readily do so, the front ends of the fender-blades are cut off obliquely, as shown, thus presenting a runner-shaped appearance, or they may be otherwise suitably shaped for the purpose set forth.

Having thus described the invention, what is claimed is—

1. In a fender, a supporting-bar having a downturned portion, upwardly-extending hooks near the free end of the latter, fender-blades, and straps connected exteriorly with said blades and having converging portions pivotally connected with the supporting-bar and adapted to engage the hooks near the free end of the bar.

2. A tiltable cultivator-beam, a quarter-twisted bar connected with the beam and having a downturned portion provided with supporting-hooks, and fender-blades pivotally connected with the downturned supporting member by means of straps or bars secured exteriorly upon said fender-blades.

In testimony that I claim the foregoing as my own I have hereto affixed my signature in the presence of two witnesses.

ROBERT L. YOUNG.

Witnesses:
T. J. YOUNG,
T. J. MURPHY.